United States Patent
Quer et al.

(10) Patent No.: US 9,423,292 B2
(45) Date of Patent: Aug. 23, 2016

(54) SENSOR WITH A VIBRATING MEMBER IN A CAVITY WITH INTEGRATED ANOMALY DETECTION

(71) Applicant: THALES, Neuilly-sur-Seine (FR)

(72) Inventors: Regis Quer, Saint Peray (FR); Yann Planchette, Valence (FR); Jean-Michel Muguet, Rochefort-Samson (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/409,432

(22) PCT Filed: May 28, 2013

(86) PCT No.: PCT/EP2013/060955
§ 371 (c)(1),
(2) Date: Dec. 18, 2014

(87) PCT Pub. No.: WO2013/189700
PCT Pub. Date: Dec. 27, 2013

(65) Prior Publication Data
US 2015/0153220 A1 Jun. 4, 2015

(30) Foreign Application Priority Data
Jun. 22, 2012 (FR) ...................... 12 01771

(51) Int. Cl.
*G01H 13/00* (2006.01)
*G01L 9/00* (2006.01)
*G01C 19/5649* (2012.01)
*G01C 19/5776* (2012.01)
*G01L 27/00* (2006.01)
(Continued)

(52) U.S. Cl.
CPC ............ *G01H 13/00* (2013.01); *G01C 19/5649* (2013.01); *G01C 19/5776* (2013.01); *G01D 3/10* (2013.01); *G01L 9/0019* (2013.01); *G01L 27/007* (2013.01); *G01P 15/097* (2013.01)

(58) Field of Classification Search
CPC ..... G01H 13/00; G01C 19/5776; G01D 3/10; G01L 9/0019; G01L 27/007; G01P 15/097
USPC ........................................................... 73/579
See application file for complete search history.

(56) References Cited

U.S. PATENT DOCUMENTS

| | | | |
|---|---|---|---|
| 4,114,454 A * | 9/1978 | Ernyei | G01R 33/18 73/579 |
| 5,188,983 A * | 2/1993 | Guckel | G01L 1/183 29/621.1 |

(Continued)

OTHER PUBLICATIONS

Herve Mathias et al.; "Architecture for the Integrated MEMS Resonators Quality Factor Measurement"; DTIP of MEMS and MOEMS 2007; Apr. 25-27, 2007; Stresa, Italy.

*Primary Examiner* — Laura Martin
*Assistant Examiner* — Rose M Miller
(74) *Attorney, Agent, or Firm* — Michael J. Donohue; Davis Wright Tremaine LLP

(57) ABSTRACT

The invention relates to vibrating micro-systems, and notably but not exclusively to pressure, acceleration, or angular speed micro-sensors with a resonator in an evacuated cavity.

The resonator (10) with a vibrating element is placed in an oscillating circuit controlled by a closed-loop control, the oscillating circuit supplying an oscillating signal y(t) at a resonance frequency Fp representing the measurement of a physical quantity. The resonance frequency is calculated by counting pulses over a time window. The sensor furthermore comprises means for calculating a continuity parameter Pc representing the variations in the result of the calculation of the resonance frequency over the course of the successive time windows, and means for comparing the parameter Pc with a threshold in order to deduce from this information on the degradation of the precision of the sensor.

7 Claims, 5 Drawing Sheets

(51) Int. Cl.
    *G01D 3/10*     (2006.01)
    *G01P 15/097*     (2006.01)

(56) References Cited

U.S. PATENT DOCUMENTS

| | | | | |
|---|---|---|---|---|
| 5,458,000 A | * | 10/1995 | Burns | G01D 3/0365 |
| | | | | 73/497 |
| 2005/0204814 A1 | * | 9/2005 | Yokoi | G01C 19/5776 |
| | | | | 73/504.12 |
| 2007/0156289 A1 | * | 7/2007 | Altieri | G01M 1/22 |
| | | | | 700/280 |
| 2008/0289419 A1 | * | 11/2008 | Legoll | G01H 13/00 |
| | | | | 73/579 |
| 2011/0285444 A1 | * | 11/2011 | Uemura | G01C 19/5614 |
| | | | | 327/299 |
| 2012/0055254 A1 | * | 3/2012 | Yamaguchi | B06B 1/0207 |
| | | | | 73/649 |

* cited by examiner

SENSOR WITH A VIBRATING MEMBER IN A CAVITY WITH INTEGRATED ANOMALY DETECTION

BACKGROUND OF THE INVENTION

1. Field of the Invention

The field of the invention is that of vibrating micro-systems, and notably, but not exclusively, micro-sensors whose measurement principle is based on the oscillation frequency of an oscillating mechanical system, using a beam or beams, a membrane or membranes, formed by means of micro-machined electro-mechanical structures, known as MEMS, placed in an cavity under vacuum.

The invention is more particularly applicable to precision sensors, such as those carried onboard aircraft and used for guidance or piloting assistance, supplying indications of pressure, acceleration or angular velocity. These sensors must supply a measurement whose actual level of accuracy must be known at each moment in time, because these measurements are used for critical or essential functions for the safety or the mission of the aircraft. For example, a false indication of static pressure leads to an erroneous indication of altitude. It will be well understood to what extent it is essential that the flight management system and the pilot are aware of this error.

2. Description of Related Art

Vibrating resonator micro-sensors are microstructures containing materials such as quartz and silicon, which use the resonance of a (or sometimes several) vibrating elements. The resonator is typically a vibrating strip or a beam, enclosed within a chamber under a controlled atmosphere, typically under vacuum.

The formation of these microstructures is very advantageous because they are obtained by collective fabrication processes using the usual fabrication steps for electronic integrated circuits, and allow the fabrication of very small and inexpensive components.

The well-known principle of the measurement is as follows: a particular resonance mode of the vibrating resonator is used, controlled by an excitation circuit comprising an automatic gain control loop. An external physical quantity applied to the vibrating resonator is thus converted into a variation of the resonance frequency or a variation of the amplitude of the vibrational motion. This variation in resonance frequency or in amplitude allows the applied stress to be measured.

Pressure micro-sensors, micro-accelerometers, or micro-gyrometers are fabricated according to this principle such as notably respectively described in the patent applications FR0215599, FR9202189 and FR0507144.

FIG. 1 illustrates very schematically the functional elements of a micro-sensor with closed-loop control. A resonator 10 with one or more vibrating element(s) 11 is included in a closed-loop electronic circuit 20 for automatic gain control. The loop 20 typically comprises a signal detection circuit 21, and an automatic gain control circuit 22 AGC. The detection circuit 21 typically comprises a signal amplifier and a band-pass filter, and is characterized by a gain $G_d$. This detection circuit 21 detects an electrical signal, representative of the oscillation of the resonator, for example a current, and supplies at the output a corresponding electrical signal y(t) after filtering and amplification; this signal represents the oscillating motion of the resonator.

This electrical signal y(t) and an external amplitude setpoint C can be applied to the input of the automatic gain control circuit 22, which supplies at the output a corresponding electrical excitation signal E applied to the resonator. The circuit 22 and the setpoint C are designed to make the vibrating element (or the vibrating elements) of the resonator vibrate with predetermined oscillation amplitude $A_0$.

In the absence of any stress, for example under a zero external pressure for a pressure sensor, or in the case of a zero acceleration for an accelerometer, the vibrating element oscillates at its natural resonance frequency $Fp_0$. In the presence of a stress of value σ, the resonance frequency will vary and will take a value Fp, and it is the difference in frequency $Fp-Fp_0$ on which the measurement is based. The measurement is, in practice, supplied by a signal processing device 30, generally a digital processing system which samples the signal y(t) and which analyses it by any known techniques in order to determine the frequency Fp and to supply the corresponding measurement M of the physical stress sought (pressure, acceleration, angular velocity), based on the variation between the measured frequency Fp and the resonance frequency $Fp_0$ without stress. This variation in frequency is thus an image of the applied stress.

For the fields of application indicated hereinabove, the sensors must have an excellent performance in terms of sensitivity, accuracy and scale factor. The guarantee of the precision of the measurement of a micro-sensor is intimately linked to the maintenance of the vacuum within the sensor. Indeed, the resonator of the sensor must have a very high quality factor of the resonance, of the order of a few tens of thousands ($10^4$) to several millions ($10^6$), but a deterioration in the vacuum corresponds to a deterioration of the quality factor, and this deterioration of the quality factor results first of all in a deterioration of the signal-to-noise ratio and finally in a loss of precision of the measurement.

Under operational conditions, the structure of the micro-sensors may get degraded. Notably, a partial loss of vacuum in the sensor may occur, leading to a loss of precision in the measurement that the user has no means of detecting. This is a major drawback of these micro-sensors. In fields such as that of avionics, it is indeed essential to know, at all times, whether the measurement supplied is reliable or not.

For example, for an onboard pressure sensor in an aircraft, it could be envisioned to verify the measurement of the sensor by other sources such as the inertial data, the GPS positioning data, or the radio-altimetric height data. However, these sources have a limited availability or an insufficient precision, and they moreover only indirectly represent the measurement that it is desired to verify.

According to the rules of the art, a verification by redundancy can be set up with a second sensor, similar to the first, which is very unlikely to fail at the same time as the first; but in case of discrepancy, then a third sensor is needed in order to determine which is the defective sensor.

Lastly, these solutions do not provide a diagnostic for a failure nor an advanced warning of a degradation.

Generally speaking, it is desirable to be able to monitor, during operation, the performance characteristics of a micro-sensor and to detect the fact that the measurement has gone outside of an acceptable tolerance.

SUMMARY OF THE INVENTION

In the invention, the idea is to enable the detection of an out of tolerance as near as possible to an acceptable threshold, and ideally to anticipate an out of tolerance, via self-test means, in other words means which do not rely on the presence of other devices external to the sensor. The invention is therefore situated within a context of a search for self-testability integrated into these sensors, based on the monitoring of several internal parameters linked with characteristics of the sensor. The invention also provides integrated self-test functions, with limited integration costs and without any impact on the operational performance of the sensor and, notably, without any temporary loss of the measurement at the output of the sensor.

The improvement in the detectability of a degradation of a sensor, already real or close to the tolerance limits, is achieved by the definition of various parameters available at the output of the sensor, whose exploitation in a combined fashion or otherwise allows the monitoring of the sensor to be improved.

In this context, the subject of the present invention is a novel source of information for the monitoring of a vibrating resonator sensor, with the aim of detecting, or even of anticipating, a problem with the health of the sensor, and more especially, a partial loss of vacuum, in other words an increase in the residual pressure that is sufficiently significant to induce a measurement error.

Sensors with one or more vibrating element(s), have in common the incorporation of means for measuring the frequency of vibration of the vibrating element (or of each of the vibrating elements) of the sensor, this frequency representing the measurement sought.

In the invention, it is shown that a degradation of the internal vacuum, in other words an increase in the pressure in the chamber containing the vibrating element, can have a direct effect on the calculation of the frequency of vibration of this element, and hence on the precision of the measurement at the output.

In order to solve this problem, a continuity parameter is defined that is representative of the continuity of the measurement of frequency of a vibrating element, in the steady state.

This parameter has various advantages: it is simple to extract because it uses signals available in the frequency measurement circuit; the monitoring of this parameter in a sensor is also simple to implement, typically by adding a few lines of code in the processing programs which establish the measurement results; this monitoring not only allows a loss of vacuum to be detected, but allows it to be done very promptly, by anticipating the moment when it will become crippling; it can lastly also allow a quantification of the loss of vacuum detected.

In an integrated self-monitoring system for such sensors, such a parameter thus provides information that is valuable on its own, and which completes the other information obtained for example from the monitoring of the quality factor of the resonator (cf "Architecture for integral mems resonators quality factor measurement" Herve Mathias et al—ISBN 978-2-35500-000-3—Symposium DTIP from the 25-27 Apr. 2007) or of the gain of the automatic gain control loop (EP1831663).

Accordingly, the invention provides a resonator measurement sensor, comprising a resonator with a vibrating element placed in an oscillating circuit controlled by a closed-loop control, the oscillating circuit supplying an oscillation signal at a resonance frequency Fp representing the measurement of a physical quantity (such as the pressure, the acceleration, etc.);

and a processing circuit for calculating this resonance frequency;

the processing circuit comprising means for conditioning the oscillating signal so as to produce a square-wave signal at the resonance frequency, means for periodically producing a counting time window, at least one counter incremented by the square-wave signal at the resonance frequency during the counting time window, and means for calculating the resonance frequency based on the content of the counter;

the sensor being characterized in that it comprises means for calculating a continuity parameter Pc representing the variations in the result of the calculation of the resonance frequency over the course of the successive time windows, and means for comparing the parameter Pc with a threshold so as to deduce from this information on the degradation of the precision of the sensor.

Preferably, the measurement circuit comprises a first counter receiving the square-wave signal at the resonance frequency and counting a number N of periods of the resonance frequency Fp over the duration Tc of the window, a second counter receiving a signal at a clock frequency $F_{clk}$ higher than the resonance frequency and counting the number n of clock periods during the N periods of the resonance frequency, the calculated resonance frequency Fp being equal to the clock frequency multiplied by the ratio N/n.

The threshold with respect to which the continuity parameter is compared is preferably equal to or less than $F_{clk}/n$, the exceeding of this threshold indicating an operational anomaly.

The invention is especially applicable to sensors whose vibrating element is placed in a cavity under a high vacuum.

A monitoring in real time of the quality of the vacuum in the sensor can thus be provided, in a simple manner, using the signals naturally available from the sensor and the means for processing signals and for calculation naturally provided in the sensor, in such a manner that both the measurement from the sensor and a measurement that provides information on the reliability of this measurement are available in real time, without interfering with the operation of the sensor and at the expense of only a few lines of additional code.

Other features and advantages of the invention are detailed in the following detailed description and the invention is illustrated in the drawings in which:

FIG. 1, already described, is a simplified schematic diagram of a measurement micro-sensor with a resonator using vibrating elements, with excitation control using an automatic gain control loop;

DETAILED DESCRIPTION OF THE INVENTION

The self-test device will now be described with regard to a MEMS pressure sensor whose transducer is micro-machined starting from silicon wafers. This case is easily transposable to an acceleration or rotation sensor.

The pressure sensor illustrating the invention is a sensor with a vibrating beam resonator. This uses a beam placed within an evacuated cavity closed by a thin membrane which is subjected to the outside atmospheric pressure, which constitutes the physical quantity PR to be measured. The beam is connected on one side to the membrane and is accordingly subjected to an axial tension owing to the deformation of the membrane in the presence of a pressure. The tension on the beam therefore depends on the pressure to be measured.

The resonance frequency depends on the axial mechanical tension—in other words the force or stress along the axis—of the beam. If $\sigma$ is the axial stress exerted on the beam, $Fp_0$ the natural resonance frequency, and $\sigma_c$ the critical buckling stress of the beam, it may be considered that the resonance frequency Fp in the presence of the axial stress 6 is given by the equation:

$$Fp=Fp_0(1+\sigma/\sigma_c)^{1/2}$$

The resonance frequency Fp will be measured and the theory allows the axial stress $\sigma$ to be deduced from this, and hence the atmospheric pressure PR which generates this stress.

Figure 1:
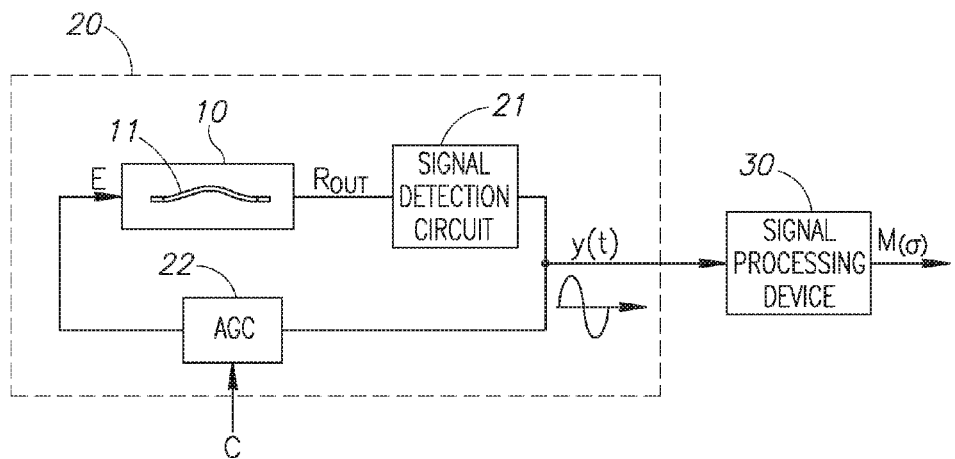
Figure 2A:
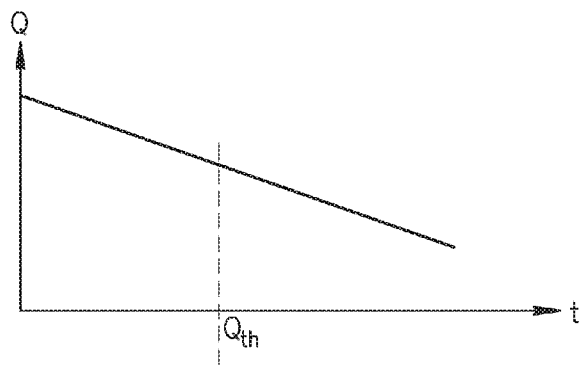
FIG. 2b illustrates the degradation of the measurement precision of a micro-sensor with a vibrating element resonator when the quality factor decreases (example of a linear drift over time in FIG. 2a)
Figure 2B:
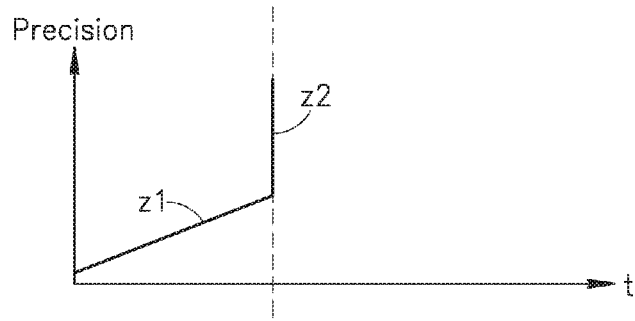
Figure 3:
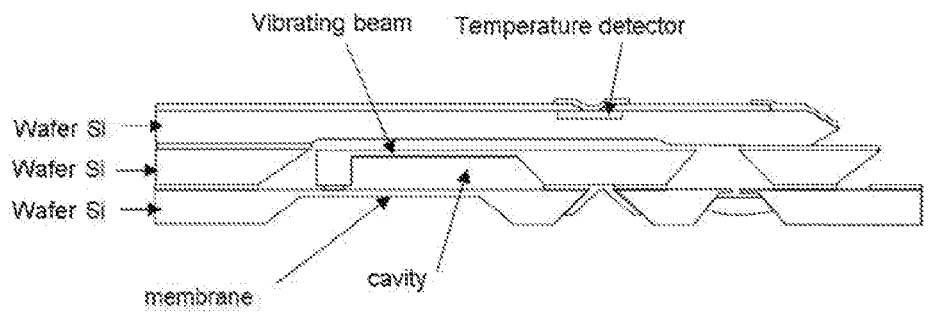
FIG. 3 shows a diagram of a general structure of a pressure sensor transducer using a resonant beam, micro-machined in silicon.

Such a sensor, or more exactly the "transducer" part of this sensor, is shown schematically in FIG. 3. The rest of the sensor, in other words the electronics which excite the oscillation of the vibrating beam and which process the output signals from the transducer, is formed on an electronic board onto which the transducer is mounted, the most often in the form of a cell, in other words of a housing with small dimensions which contains the transducer. The transducer made of micro-machined silicon is also referred to as the "sensitive element" or "detector". This board is not shown.

Such a sensor is for example described in the European patent applications Nos. EP0557216 and EP1995575.

Figure 4:
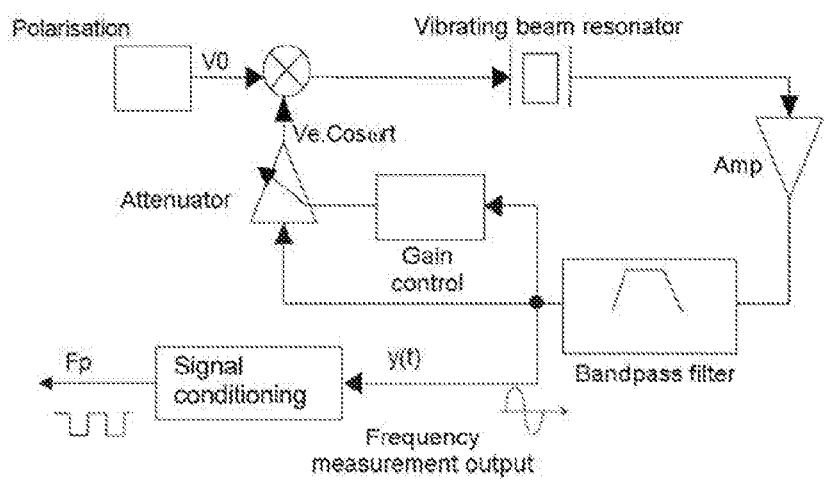
FIG. 4 shows a circuit diagram of the closed-loop control used to sustain an electrical excitation at the resonance frequency of the vibrating beam.

In practice, the vibration of the beam is sustained by electrostatic forces produced by an oscillating electrical signal whose frequency is automatically closed-loop controlled at the resonance frequency of the beam, and this frequency of electrical oscillation is measured. A closed-loop control shown in FIG. 4 allows the vibration to be driven at this frequency. This loop comprises the application of a DC bias voltage V0 to an excitation electrode capacitively coupled with the beam; the AC voltage of amplitude Ve resulting from the oscillation at the resonance frequency is superimposed onto this voltage V0. The loop may comprise an amplifier at the output of the resonator, a bandpass filter, a gain control device, an attenuator receiving the output from the bandpass filter and controlled by the gain control circuit. It is from this loop that a signal at the resonance frequency is output, either at the output of the bandpass filter, or at an output of the attenuator.

The frequency Fp of this output signal, which is the resonance frequency of the beam, is measured and it is this measurement that will be used for the calculation of the pressure.

The frequency measurement is preferably carried out by a square-wave rising or falling edge counting method. In particular, the number of periods of the signal at the resonance frequency Fp can be counted over a known fixed duration Tc. A frequency Fp can be directly deduced from this if the value of Tc is precisely known.

However, the preferred counting method is a double counting method which is explained with reference to FIGS. 5 and 6 and which comprise the following operations.

Figure 5:
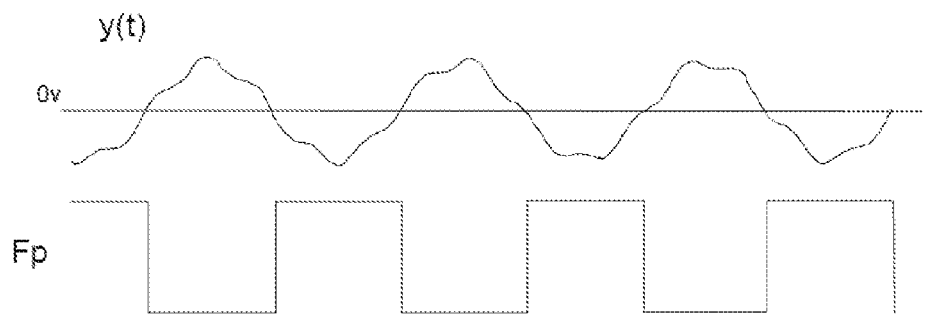
FIG. 5 shows the conditioning of a resonance frequency analog signal by a Schmitt trigger circuit.

First of all, the signal y(t) at the resonance frequency coming from the closed-loop control is transformed into a square-wave signal whose rising and falling edges coincide with the zero crossings of the signal (FIG. 5). This operation is conventional and uses for example a circuit known as a "Schmitt trigger" which detects the passages through zero with a switching threshold defined in such a manner as to avoid spurious switching events in the presence of noise under nominal operation.

This circuit produces a square-wave signal at the resonance frequency Fp.

Subsequently, a signal is established at a relatively low frequency Fc, for example around thirty Hertz, whose period Tc (typically around 30 ms) defines a counting time window during which the periods of the resonance frequency Fp will be counted. A counter could for example be used whose counting is alternately enabled then interrupted by the falling edges of the low frequency Fc. The counter would then possess a counting input for receiving the square-wave at the resonance frequency Fp and for being incremented at each falling edge of this frequency Fp. The content N of the counter would then represent the number of periods of the frequency Fp and would therefore allow this frequency to be calculated with the proviso that the duration Tc is known.

It is however preferred to operate in a higher resolution manner by using two counters that are enabled for the duration Tc and which are incremented for the first counter using the edges of the resonance frequency Fp;

for the second counter using the edges of a clock signal at a frequency $F_{clk}$ much higher than the resonance frequency (at least 100 times higher).

Figure 6:
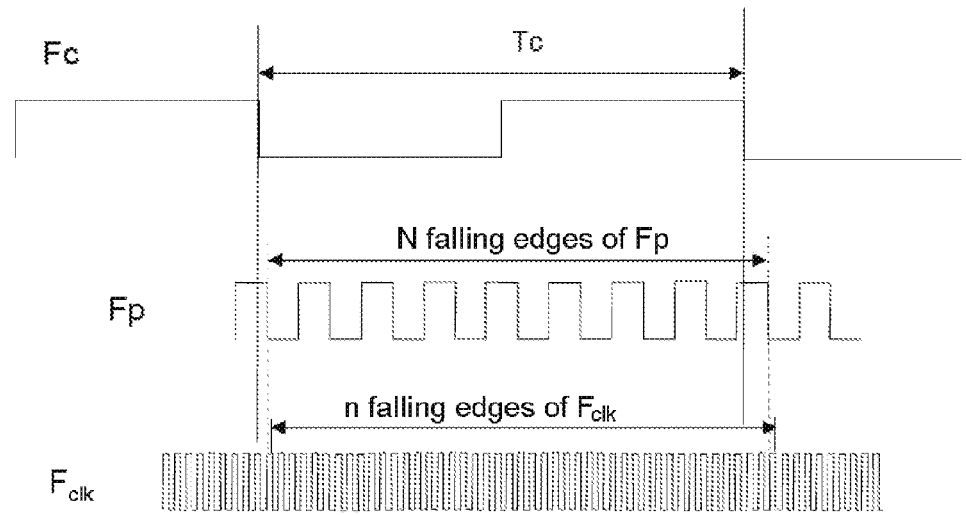
FIG. 6 shows the principle of double counting during a time window, enabling the calculation of the resonance frequency.

Thus, as is illustrated in FIG. 6, the first counter is incremented on the first falling edge of the square-wave signal at the frequency Fp after the falling edge of the signal at the frequency Fc; the counting is interrupted at the moment of the first falling edge of the signal Fp after the falling edge of the signal at the frequency Fc. The content N of the first counter represents overall a number of falling edges of the signal at the resonance frequency over a counting window of duration Tc=1/Fc.

A second counter is incremented starting from the first falling edge of the clock signal which follows the start of incrementation of the first counter; it is interrupted at the moment of the first falling edge of the clock signal that follows the stopping of the counting of the first counter. The content n of the second counter represents overall a number of falling edges of the clock signal $F_{clk}$ during the counting window.

The resonance frequency Fp can be considered as being equal to the clock frequency multiplied by the ratio N/n.

$$Fp=N \cdot F_{clk}/n$$

This solution with two counters notably allows the uncertainties in the value of the duration of the window Tc to be overcome and to base the calculation rather on the better-controlled value of the clock frequency.

The uncertainty in the calculation of Fp is $$\Delta Fp/Fp=\Delta N/N+\Delta F_{clk}/F_{clk}+\Delta n/n.$$

It can be considered that the uncertainty in the counting of n is equal to the ratio between the period Tc and the duration of a clock period, in other words that the number of clock falling edges can be counted to the nearest unit.

Figure 7:
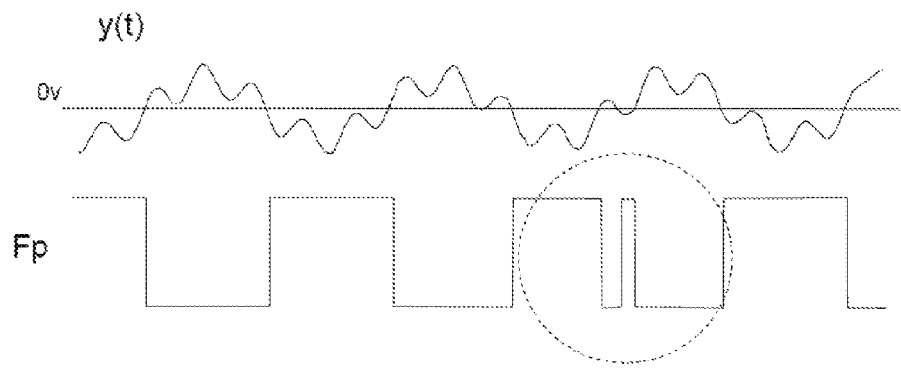
FIG. 7 shows a conditioning of the resonance frequency signal in the presence of a noise signal capable of generating undesirable transition edges.
Figure 8:
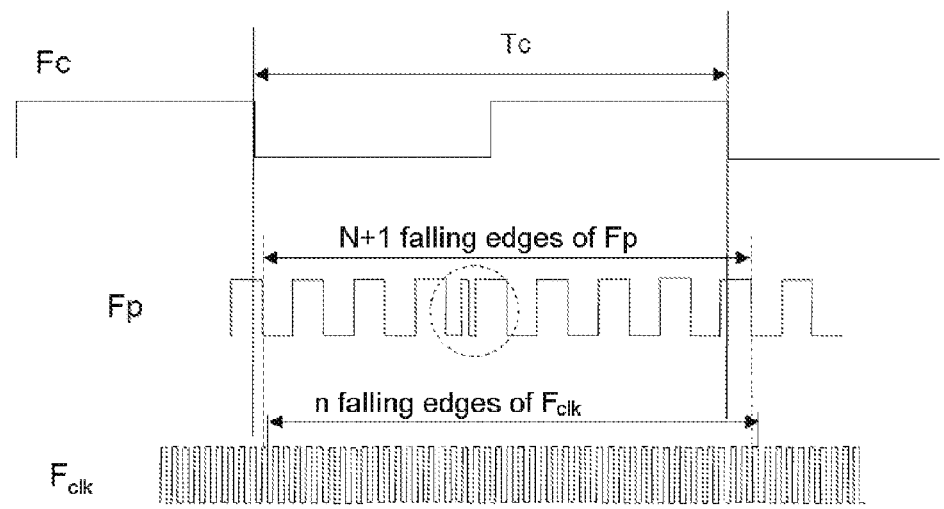
FIG. 8 shows the counting which results from the situation in FIG. 7.

FIGS. 7 and 8 show what happens when the signal at the resonance frequency is affected by an anomaly that can falsify the measurement. The example that is given is the following: the measurement signal at the resonance frequency Fp is affected by a sinusoidal voltage noise signal which is superimposed onto the signal resulting from the resonance. If the amplitude of the variations in voltage due to the superimposed sinusoidal noise is such that the Schmitt trigger switches spuriously (because the signal falls below zero or below a lower threshold at a time where it ought not to), the number of falling edges of the frequency Fp transformed into a square-wave signal will be falsified.

The spurious edge is counted by the first counter as can be seen in FIG. 8 (N+1 edges instead of a theoretical number N). This results in an error of one unit in the content of the first counter. This error of one unit represents an error in frequency equal to $F_{clk}/n$. In this example, a single spurious edge is illustrated but in reality the error could be several units.

According to the invention, a continuity parameter Pc is considered which represents the abnormal variations in the frequency Fp, in other words variations which should not occur given the fact that the quantity measured by the sensor (pressure or acceleration, for example) is only subject to slow variations without any jumps in value.

The preferred continuity parameter is the difference between two successive values of Fp obtained by a pulse-counting method such as that which has just been described.

The parameter PC, to which an index i is assigned, i.e. $Pc_i$, may be expressed as:

$Pc_i = Fp_i - Fp_{i-1}$, where i is an index representing the rank of the counting window of duration Tc in a succession of counting time windows, $Fp_i$ is the measurement obtained by counting during the window of rank i, and is the measurement of frequency obtained during the preceding window of rank i−1.

The parameter is preferably calculated at each counting window. It is therefore supplied with a frequency Fc=1/Tc.

According to the invention, the parameter $Pc_i$ is monitored and the exceeding of a tolerance threshold for this parameter is detected. The tolerance threshold is preferably equal to $F_{clk}/n$. In order to detect this out of tolerance (corresponding to one unit of counting of the periods of Fp during a window of duration Tc, hence one unit of error in N), a comparator is used which compares $Pc_i$ with a reference threshold. The latter threshold can for example be equal to $F_{clk}/2n$ in order to correctly discriminate the presence of a jump in value $F_{clk}/n$. It may also be in the range between $F_{clk}/2n$ and $F_{clk}/n$.

The comparison with this threshold is meaningful as long as the natural fluctuations in the frequency Fp during the counting window are much less than the value $F_{clk}/n$. "Natural variations" is understood to mean the natural noise of the signal produced by the resonance loop and the natural fluctuations in Fp as a function of the environmental conditions.

The orders of magnitude can be as follows:
$F_{clk}$ equal to 20 MHz
$T_c$=30 ms
$F_p$ can be from 30 to 70 kHz the variation of frequency as a function of the pressure which it is sought to measure (pressure sensor) can be around 6 to 10 Hz per hectopascal (hPa).

The measured number N can be from a few hundreds to a few thousands; the number n is several hundreds of thousands.

An error of one unit of counting can correspond to several hectopascals, for example around 4 hPa; it is much higher than the natural variations of the pressure to which the sensor carried onboard an aircraft is subjected:

the variations in pressure in the environment of the aircraft do not exceed 200 hPa per minute, or 0.1 hPa over a period Tc=30 ms;

the variations in temperature (which come into the calculations supplying the pressure from the resonance frequency) do not exceed 5° per minute, which corresponds to a fluctuation in Fp much less than 1 hPa over the period Tc=30 ms;

the uncertainty of one unit on the counting n is 1/n, which is much less than 1/N;

finally, the uncertainty in the digitization (1LSB) represents several hundreds of times less than the error due to exceeding the value of the continuity parameter.

Accordingly, the monitoring of the continuity parameter can prove to be a valuable indication of a serious intrinsic anomaly in operation of the sensor.

When there is a loss of vacuum from the cavity containing the resonator, the peak amplitude of the signal at the resonance frequency decreases. However, the electronic noise does not decrease because it is intrinsic to the signal detection chain. The signal/noise ratio is therefore degraded. The signal is subsequently conditioned by a Schmitt trigger circuit, whose rising and falling switching thresholds are adjusted by two resistors. The difference in value (hysteresis) between these two thresholds can be adjusted; and it can be determined starting from which value of signal/noise ratio spurious switching events, such as explained with reference to FIG. 7, can occur and affect the counting.

Measurements have been made on a pressure sensor by making the internal pressure of the cavity vary so as to simulate a loss of vacuum. It has been observed that, up to an internal pressure of 0.1 hPa, no anomaly of the continuity parameter was detected. For a pressure of 0.11 hPa, two counting anomalies were detected.

Figure 9:
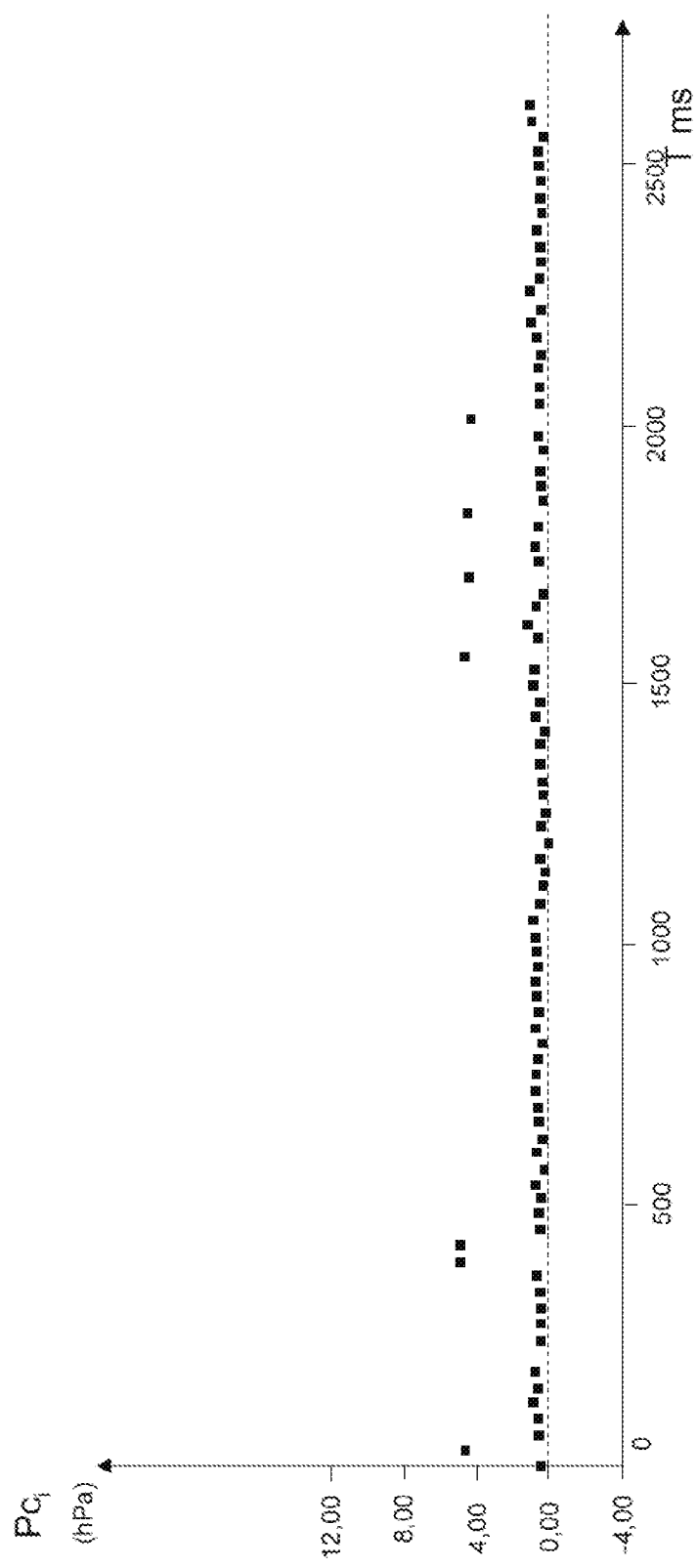
FIG. 9 shows the variation over time of the continuity parameter $Pc_i$ calculated according to the invention, with an illustration of continuity anomalies.

For a pressure of 0.12 hPa, seven anomalies were detected; these anomalies are shown on the curve in FIG. 9: this curve shows the time in milliseconds as abscissa, and the continuity parameter (here directly expressed in hectopascals rather than in resonance frequency) as ordinate; the continuity parameter $Pc_i$ is represented by points distributed every 30 milliseconds, the assumption being that Tc=30 ms.

This curve clearly shows that the detection of the continuity parameter is a source of important information on the health of the sensor, and in particular on the loss of vacuum in the cavity which affects the health of the sensor since anomalies detectable by this continuity parameter $Pc_i = Fp_i - Fp_{i-1}$ may in fact be due to a loss of vacuum in the cavity, which loss of vacuum is furthermore known to influence the precision of the measurement.

The invention claimed is:

1. A resonator measurement sensor, comprising
   a resonator with a vibrating element placed in an oscillating circuit controlled by a closed-loop control, the oscillating circuit supplying an oscillating signal y(t) at a resonance frequency Fp representing the measurement of a physical quantity,
   and a processing circuit for calculating this resonance frequency,
   the processing circuit comprising means for conditioning the oscillating signal so as to produce a square-wave signal at the resonance frequency Fp, means for periodically producing a counting time window, at least one counter incremented by the square-wave signal at the resonance frequency during the counting time window, and means for calculating the resonance frequency from the content of the counter,
   the sensor being characterized in that it furthermore comprises means for calculating a continuity parameter Pc representing the variations in the result of the calculation of the resonance frequency over the course of successive time windows, and means for comparing the parameter Pc with a threshold in order to deduce from this information on the degradation in the precision of the sensor.

2. The sensor as claimed in claim 1, wherein the processing circuit comprises a first counter receiving the square-wave signal at the resonance frequency and counting a number N of periods of the resonance frequency Fp over the duration Tc of the window, a second counter receiving a signal at a clock frequency Fclk higher than the resonance frequency and counting a number n of clock periods over the N periods of the resonance frequency, the resonance frequency Fp calculated being equal to the clock frequency multiplied by the ratio N/n.

3. The sensor as claimed in claim 1, wherein the continuity parameter is calculated periodically at the frequency of the counting time window, and its value $Pc_i$ for a window of rank i is equal to Fpi−Fpi−1, where Fpi is the resonance frequency calculated from the counting window of rank i and Fpi−1 is the resonance frequency calculated from the preceding counting window of rank i−1.

4. The sensor as claimed in claim 1, wherein the processing circuit comprises a first counter receiving the square-wave signal at the resonance frequency and counting a number N of periods of the resonance frequency Fp over the duration Tc of the window, and a second counter receiving a signal at a clock frequency Fclk higher than the resonance frequency and counting a number n of clock periods over the N periods of the resonance frequency and the threshold with respect to which the continuity parameter is compared is equal to Fclk/2n or in the range between Fclk/2n and Fclk/n.

5. The sensor as claimed in claim 1, wherein the vibrating element is placed in a cavity under a high vacuum, the detection of the exceeding of the threshold being a probable indication of a loss of vacuum.

6. The sensor as claimed in claim 2, wherein the continuity parameter is calculated periodically at the frequency of the counting time window, and its value $Pc_i$ for a window of rank i is equal to Fpi−Fpi−1, where Fpi is the resonance frequency calculated from the counting window of rank i and Fpi−1 is the resonance frequency calculated from the preceding counting window of rank i−1.

7. The sensor as claimed in claim 6, wherein the vibrating element is placed in a cavity under a high vacuum, the detection of the exceeding of the threshold being a probable indication of a loss of vacuum.

* * * * *